Aug. 27, 1963 P. F. MAEDER 3,102,224
MAGNETOHYDRODYNAMIC A.C. GENERATOR
Filed Feb. 17, 1960 2 Sheets-Sheet 2

INVENTOR.
PAUL F. MAEDER
BY
Dike, Thompson & Bronstein
ATTORNEYS

United States Patent Office 3,102,224
Patented Aug. 27, 1963

3,102,224
MAGNETOHYDRODYNAMIC A.C. GENERATOR
Paul F. Maeder, Rumford, R.I., assignor of one-half to
Paul Levinger, Providence, R.I.
Filed Feb. 17, 1960, Ser. No. 9,325
5 Claims. (Cl. 322—47)

The present invention relates to improvements in the generation of alternating current electric power and, in one particular aspect, to novel and improved electric power generating apparatus operating uniquely on magnetohydrodynamic principles in which alternating current outputs are developed directly under conditions of high thermal and electrical efficiencies and in which the need for collector electrodes is obviated.

Generation of electric power by means of conventional boiler-turbine-generator assemblies is known to involve vast capital expenditures for equipment having large mass and high precision which is difficult to maintain and operate and which nevertheless yields only relatively low efficiencies. These obvious disadvantages have long served to provoke alternative proposals for developing power, particularly through more direct conversions of other forms of energy into electrical signals. By way of example, there have been proposals which would rely upon such phenomena as electron emissions from heated substances, or thermoelectric effects exploiting contact potentials in thermopiles, or simple Faraday induction within conductive fluids. The latter effect has held special promise because of the theoretical likelihood that substantial quantities of power could be generated, particularly when an ionized gaseous fluid is selected as the conducting medium, although there are serious practical limitations such as those dictated by the destructively high temperatures which are involved and by the misfortunes that output signals must be collected by electrodes and are wholly unidirectional unless the flow or magnetic field directions are alternated.

The origins of the thermal problems are found in the fact that a needed degree of electrical conductivity within certain useful gaseous fluids is not reached until ionizing temperatures above about 4,000° F. are developed. This not only exceeds the temperatures required to maintain good magnetic and electrical characteristics of other common materials which are involved but is also higher than their melting points. Electrodes disposed in contact with such intensely heated fluid tend to become eroded at a swift rate, and, if significant electrode cooling is resorted to, the cooled gas films appearing at the sites of the electrodes tend to lose much of their electrical conductivity which is essential to the efficient tapping of a power output. Moreover, direct current outputs find only limited applications, of course, and the wide-spread commercial acceptance and attractively high efficiencies of alternating current systems would dictate that additional equipment be provided for D.-C. to A.-C. conversions where D.-C. Faraday-type magnetohydrodynamic generators are sought to be applied commercially.

Accordingly, it is one of the objects of the present invention to provide novel and improved magnetohydrodynamic electric power generating apparatus in which alternating current outputs are developed directly while avoiding need for collector electrodes.

A further object is to provide magnetohydrodynamic alternators of relatively low-cost construction wherein destructive effects of high-temperature ionized gaseous fluids are offset by a cooling which does not impede operation at high efficiencies.

An additional object is to provide a novel and improved magnetohydrodynamic alternator which is self-excited and develops polyphase alternating current outputs at a predetermined natural frequency.

It is another object to provide magnetohydrodynamic alternators wherein high-temperature ionized gaseous fluid is conveyed within a flow path fully insulated by highly refractory material and without exposure to electrodes.

A still further object is to provide magnetohydrodynamic alternator equipment in which the flow of ionized gaseous fluid experiences automatic self-regulation to produce electrical outputs synchronized at a predetermined natural frequency.

By way of a summary account of practice of this invention in one of its aspects, an electrically conductive gaseous fluid is provided by ionization of a gas at a very high temperature, and the resulting conductive fluid is forced through a substantially linearly-directed flow passage within an alternator structure having a linearly-developed polyphase stator including a magnetic core and distributed windings. The winding distributions and interconnections, and the orientation of the stator in relation to the flow passage, are those which, upon excitation of the windings by appropriate polyphase signals, will generate resultant magnetic fields extending transversely through the passage and having intensity variations which shift longitudinally of the flow passage in the upstream-to-downstream flow direction at a high rate. Surfaces which border the fluid passageway and come in contact with the extremely hot ionized gases are formed entirely by a highly infusible lining material, such as ceramic, which is permitted to exhibit a poor electrical conductivity and which is cooled by recirculated fluids of relatively low temperature which are forced through the stator structure.

The ionized gas is released into the alternator flow passage at a sufficiently high pressure and escapes from it into a site of a sufficiently lowered pressure such that it must attain a linear velocity in excess of the apparent velocity of the aforesaid resultant magnetic field in the same linear direction. In the course of its flow through the alternator passage, the ionized gas displays the characteristics of a good electrical conductor and therefore has high electrical currents induced in it by the magnetic field from the stator. These currents traverse closed loops and, in turn, establish attendant magnetic flux fields. The latter fields react with the stator field to create a propulsive pumping action on the fluid so long as the fluid velocity is less than the linear velocity at which the stator field intensities shift. However, under the reverse conditions, which are imposed by forcing the fluid through the passageway at a higher velocity than that of the shifting stator field intenstiy, the magnetic flux fields attending the current loops induce electrical output signals in the stator windings. This generator action develops a desired pattern of polyphase output signals in the stator windings which supplies an external load and simultaneously provides a self-excitation of the windings. Frequency of the output is fixed at a natural frequency of the apparatus which may be established either by external capacitive reactance tuning the stator windings or by the frequency of synchronous apparatus paralleled with the stator windings. Residual magnetism in the stator structure may be relied upon to promote the desired action upon starting.

Although the features of this invention which are believed to be novel are set forth in the appended claims, details as to its organization and method of operation, together with the further objects and advantages thereof, may best be understood through reference to the following description taken in connection with the accompanying drawings, wherein:

Figure 1:
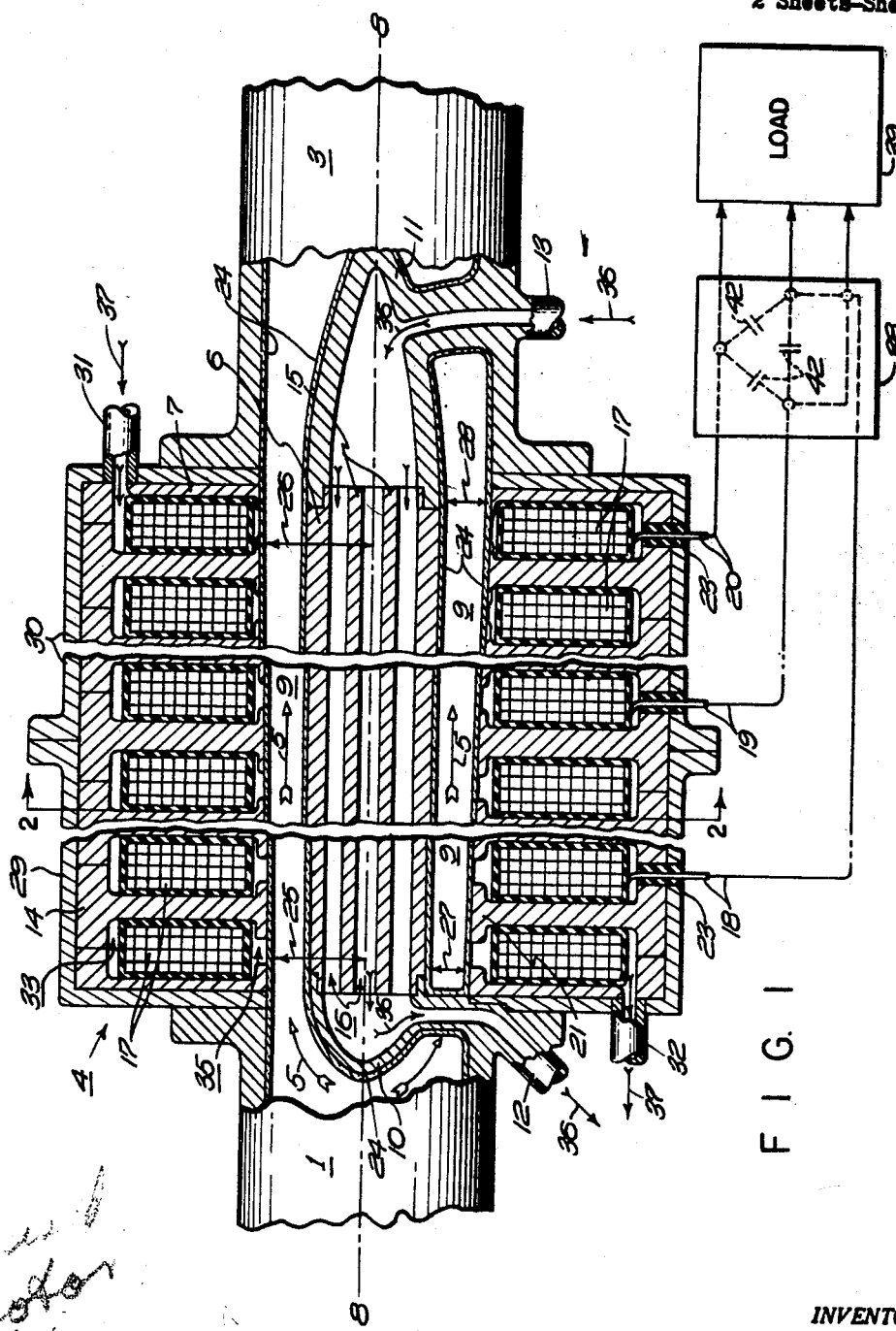
FIGURE 1 is a partly sectioned side view of one embodiment of magnetohydrodynamic alternator in which teachings of this invention are practiced.
Figure 2:
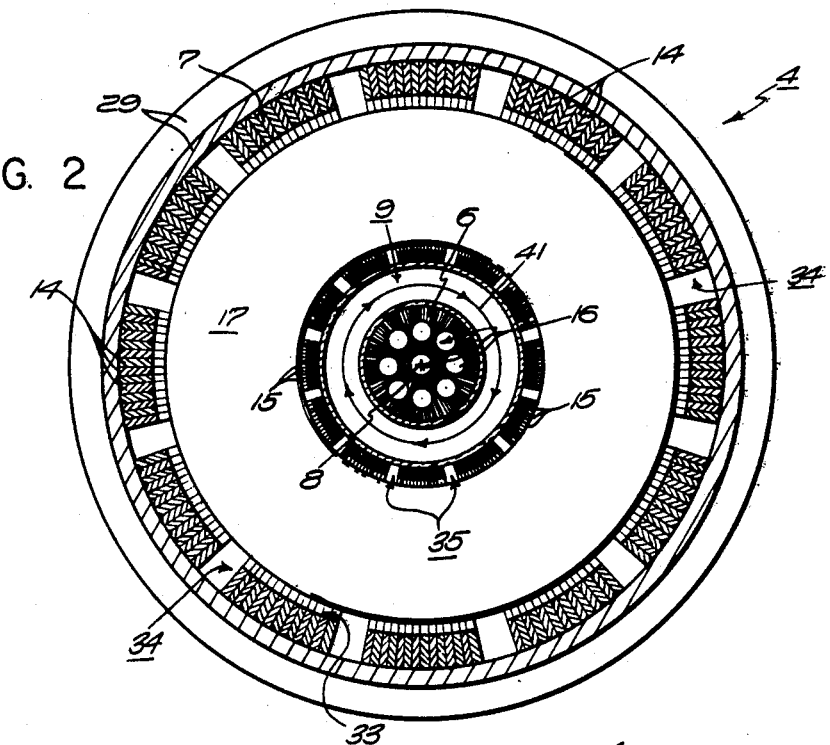
FIGURE 2 represents a transverse cross-section of the FIGURE 1 alternator taken along the section line 2—2.

In the embodiment portrayed in FIGURES 1 and 2, the alternating current generator equipment includes an upstream inlet 1 and downstream outlet 3 for coupling the flow of an electrically conductive fluid through the hollow interior of an enclosed polyphase stator structure 4 in the paths indicated by arrows 5. The generally cylindrical stator structure comprises an inner core assembly 6 and cooperating annular outer core and winding assembly 7 which is concentric with it about the central longitudinal axis 8—8, the two core assemblies being separated by a hollow radial gap defining an elongated annular fluid passageway 9. Streamlined upstream and downstream brackets 10 and 11, respectively, support the inner core assembly in its centered radial and axial relationships to the outer core assembly and are formed with hollowed interiors communicating with external conduits 12 and 13, respectively, for coolant circulation purposes described later herein. The magnetic material of both the center and outer core assemblies is subdivided in a known way to minimize losses due to certain eddy current circulations, and in the illustrated arrangement the cores are fabricated of radial outer and inner laminations 14 and 15, respectively, which extend in the longitudinal direction of the structure. A plurality of longitudinal passages 16 extending through the stack of laminations 15 afford access to the inner core material by a circulated coolant fluid forced from external conduit 13 through the brackets to conduit 12.

Annular outer stator assembly 7 includes the aforesaid laminations 14 of magnetic material and a plurality of electrical windings 17 having a polyphase connection and distribution designed to develop magnetic flux extending radially through the annular passageway 9 and exhibiting a substantially sinusoidal and apparently-moving intensity distribution in the longitudinal direction along the passageway. Six of such windings appear in the FIGURE 1 illustration, which is partly broken away and which is therefore to be understood to be of a substantially greater length where additional winding sections are accommodated. Twelve winding sections provide a magnetic field distribution which closely approximates a sinusoid, for example, when three-phase alternating current excitation is applied to the electrical connections 18, 19 and 20. However, it should be understood that no separate source of polyphase excitation is actually required, and, instead, an important self-excitation arises and occasions the wanted magnetic flux distributions in the embodiment under discussion. The winding connections may conveniently be the same as those of the field windings which develop the rotating fields of conventional alternating current motors, for example, although it will be understood that the windings 17 are in a linear rather than angular array and consequently produce a linearly-moving travelling field rather than rotating magnetic field pattern. Phasing is set to develop travelling-field patterns which move in the longitudinal upstream-to-downstream direction of the generator. Laminations 14 are in a slotted form, as shown in FIGURE 1, and exhibit pole faces, 21, about the inner periphery of the outer core assembly. As an aid to fabrication, these laminations are also subdivided into shorter sections in the longitudinal direction, such that the completed winding sections may be readily inserted into the accommodating recesses. Electrical insulation 22 about the windings and insulators 23 about the bus bars 18—20 may comprise the common insulation materials employed in high-temperature installations, examples of which are silicone-impregnated mica and glass fabrics, and ceramic insulators. All of the surfaces exposed to the fluid coursing through the generator from upstream conduit 1 to the downstream conduit 3 are lined with a smooth and entirely uninterrupted ceramic coating 24, which is substantially immune to attack and melting by the high-temperature fluids, and which is uniquely useful in this apparatus despite the fact that it is electrically non-conductive.

While elongated fluid flow passageway 9 is generally annular, it also preferably increases somewhat in cross-sectional area in the upstream-to-downstream direction. This is for the purpose of maintaining a substantially uniform linear velocity of the flowing fluid in different parts of the passageway at any instant. When the cross-sectional area is varied in inverse proportionality to the pressures diminished by the pressure drops in the passageway, the fluid linear velocity tends to remain the same throughout. Accordingly, it will be noted that in FIGURE 1 the annular cross-section passageway 9 is in fact frusto-conical, the radius 25 from axis 8—8 to the inner periphery of the outermore stator assembly 7 near the upstream end of the generator being less than the corresponding radius 26 near the downstream end. Radial thicknesses 27 and 28 of the passageway near these respective ends may also be somewhat different for the same purpose, the downstream radial thickness 28 being shown larger, and the two variations (radial thickness and frusto-conical spreading) together establishing the desired inverse proportionality of area to pressure drops. The radial magnetic gap across the passageway may be preserved unchanged while achieving the desired increase in area by variation of the frusto-conical shaping alone. The magnetic field intensity in the gaps may also be regulated by appropriate design of the windings and core material in accordance with known techniques to compensate for inequalities in field intensities in devices where the radial gap thickness is not uniform.

The outer stator assembly is shown to be enclosed by joined housing parts 29 and 30 which provide mechanical support for the outer laminations and winding sections and which seal the assembly for a forced circulation of coolant fluid about the laminations and windings. Coolant entrance and exit conduits 31 and 32, respectively, couple the coolant through the interior of the housing where it can course through spaces such as those at 33, 34 and 35 to absorb thermal energy and prevent the build-up of destructively high temperatures within the generator structure. Arrows 36 and 37 indicate coolant flow directions in the inner and outer stator assemblies, respectively, and the directions may be reversed in each instance with comparable useful results.

Figure 3:
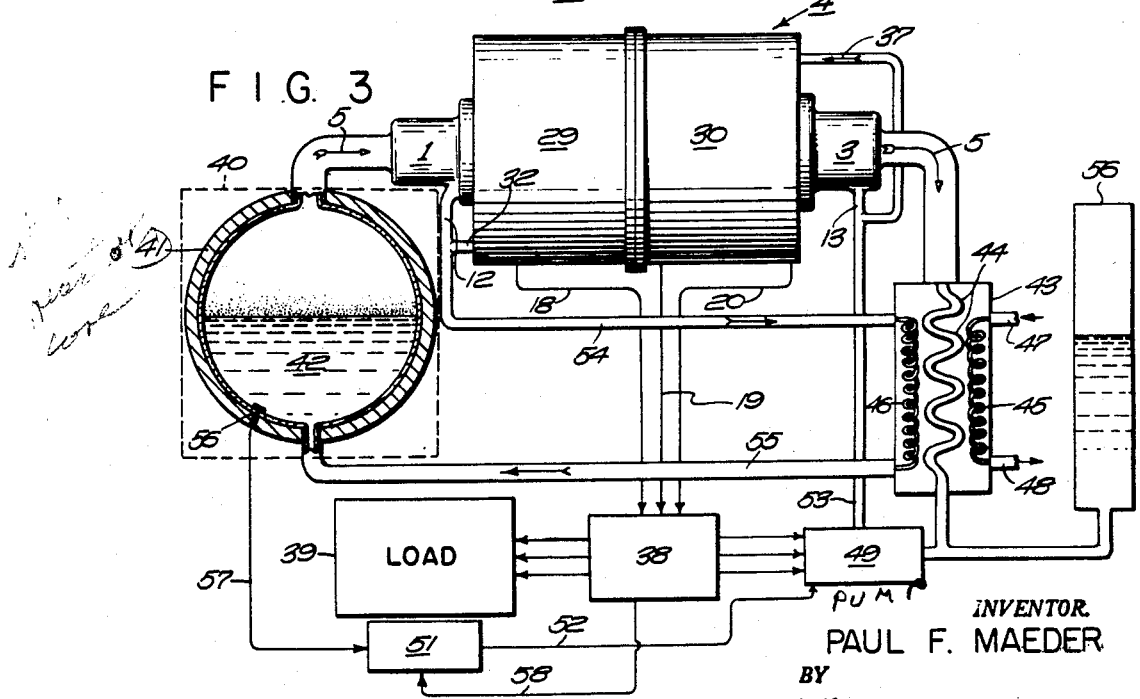
FIGURE 3 is a system diagram, in part in block, sectioned, and elementary pictorial forms, of a magnetohydrodynamic alternating current generating installation including a completely closed fluid circulation path and nuclear reactor heat source.

Three-phase bus connections 18—20 are coupled with adjustment equipment 38 and with a common form of load 39, such as loaded transmission lines. The electromagnetic stator windings not only deliver output to this load but also supply a self-excitation needed to develop the aforementioned travelling magnetic field flux patterns across passageway 9. The manner in which electrical power output is generated is conveniently developed by first postulating that the operating condition is one in which the stator assembly experiences a polyphase excitation which produces a resultant A.-C. magnetic field, the shifting pattern of which travels longitudinally along passageway 9 in the upstream-to-downstream direction. High-temperature ionized gaseous fluid thrust through the generator passageway in the direction of arrows 5 by an outside source, such as a source designated by reference character 40 in FIGURE 3, is of high electrical conductivity and therefore tends to have electrical currents induced in it because of its axial motion normal to the radial magnetic flux lines established by the stator excitation. These induced electrical currents tend to circulate in current loops which lie wholly within the fluid and which are transverse to and concentric with the longitudinal axis 8—8, as exemplified by current loop 41 in FIGURE 2. The frequency of the polyphase excitation and the physical orientations of the stator windings govern the linear velocity at which the undulating (substantially sinusoidal) resultant magnetic field shifts in position along the passageway, and this is considered a critical linear velocity for present purposes. So long as the linear flow velocity of the conductive fluid in the passageway is less than this critical velocity, the magnetic fields developed by the induced currents flowing in the transverse loops are of such direction that they interact with the radial stator field to produce forces between the fluid and stator which propel the gaseous fluid forward in the upstream-to-downstream direction. These propulsive effects diminish when the fluid flow velocity nears the critical velocity, for the reason that there is substantially no relative movement between the conductive fluid and the longitudinally-shifting magnetic flux travelling in the same direction. Importantly, however, relative movement between the fluid and longitudinally-shifting magnetic flux is experienced when the fluid linear velocity exceeds the critical velocity, and, moreover, the directions of induced currents flowing in the aforementioned loops are the reverse of what they were in the earlier-assumed case of a fluid velocity less than the critical velocity. Accordingly, the magnetic fields created by such circulating currents do not yield propulsive effects but, instead, are in direction to induce electrical signals in the polyphase stator windings as they sweep past them. These effects are regenerative, and the electrical signals induced in the stator windings by such interactions become increased as the fluid velocity is further increased, such that the available electrical power output is readily made adequate to provide needed supply to the stator windings, and to overcome the losses in the generator itself, and yet to deliver a large excess to the load. While there is a synchronous characteristic present, it is not dependent upon the absolute values of linear velocities of the fluid. Rather, the synchronous characteristic is found in the fact that frequency of the output signals is governed by the frequency of the synchronous machinery in equipment 38 parallelled with the stator windings, or, alternatively, by the tuned frequency established by the windings and parallelled capacitors. Capacitors 42 shown in a dashed-line convention within equipment 38 may serve this purpose, in which event the generator's residual magnetism alone permits the tuned stator circuitry to build up the desired effects and to become purely self-excited when the fluid is first forced through the generator at the requisite speeds. In other instances, equipment 38 is advantageously in the form of synchronous machinery, such as a synchronous alternator, synchronous motor, or synchronous converter. Frequency and voltage of the output tend to become slaved with the frequency and voltage of a parallelled synchronous alternator, the output current being dependent upon the fluid flow characteristics and, particularly, the extent to which the fluid flow velocity exceeds the critical velocity. Voltage is determined by terminal voltage of a synchronous motor or converter in the cases where these are parallelled with the generator, the initial excitation in these instances coming from a synchronous alternator or from a synchronous motor or converter driven as a generator. The synchronous apparatus operated in parallel with the generator adjusts the power factor such that it can deliver the required power.

Preferably, the winding sections of the stator assembly are of number and distribution sufficient to produce substantially sinusoidal resultant magnetic flux field patterns along the fluid passageway, and, hence, bettered output waveforms. End effect compensations, similar to those practised in electromagnetic pumping devices, are also preferred and are realized by employing small coil sections at the axial ends of the stator, such as half-wound coils. The mode of operation which has been described makes it apparent that the transverse current loops should be unobstructed and as free of distortion as possible, and it is for this reason that the inner core assembly is at least coextensive with the outer core assembly and that the upstream and downstream support brackets 10 and 11 do not obstruct the passageway 9 and are instead disposed outside the regions of the current loops.

From the described mode of operation it should also be clear that the generator action can be entirely independent of any electrodes exposed to the conductive fluid. This is in distinct contrast to and advantage over the known simple Faraday-type D.-C. generators in which a fluid is forced through a magnetic field and output signals tapped from the fluid by conductive electrodes which are in direct electrical contact with it. At the high temperatures (of the order of 4,000° F.) required for ionization of gaseous fluid, which is a preferred medium, these electrodes are subject to rapid deterioration and must be renewed or otherwise altered, with consequent complications in maintenance and interruption of service. According to the present teachings, however, the entire fluid pathway may be bordered by known forms of low-cost non-conductive refractory material such as the ceramic coating 24, which so effectively resists deterioration that the generator may be sealed into a fluid flow path on a substantially permanent basis without providing for servicing of electrodes. Installations which employ atomic fuel sources and fluids and which therefore involve hazards peculiar thereto as well as those of high temperatures, are particularly benefited by the permanently sealed character of the fluid flow paths. Moreover, all of the surfaces bordering the flow passageway may be cooled as effectively as possible, without destroying operating efficiency. In the latter connection, it should be recognized that devices requiring electrodes should be cooled to prevent their rapid deterioration, and yet this very cooling tends to lower the temperature of the gas layers on films contiguous to the electrode surfaces and, thereby, to decrease their ionization and electrical conductivity with consequent loss in electrical power which can be tapped from across the fluid. The electrode-less generator here disclosed advantageously operates with a high degree of cooling, such that cooled poorly-conducting films or layers of gas are contiguous to the surfaces of the fluid passageway, while occasioning no significant loss in conductivity of the induced current loops which lie within the cooled layers. Hence, there is no significant loss in electrical efficiency due to the cooling, and the needed protection against thermally-induced damage is not obtained at the expense of impaired operation.

A sealed closed-circuit generating apparatus in which the conductive fluid is recirculated appears in FIGURE 3, the upstream inlet 1 of generator structure 4 there being supplied with the high-temperature ionized gaseous fluid emitted at the required high velocities from a source 40. In an elementary form, this source may comprise a closed boiler vessel into which a fluid is pumped as a liquid and then vaporized into an electrically conductive gaseous fluid at a high pressure needed to impart high velocities of flow in the direction of arrows 5. A conventional coal or oil-fired furnace associated with such a boiler may serve as the heat source, or, alternatively, this may take the form of a nuclear reactor. Mercury and its conductive vapors comprise one example of a suitable fluid medium, although other materials which are particularly useful include those which are liquid at normal ambient or relatively high temperatures and which are either themselves highly conductive in the gaseous state or may be rendered so by enrichment with additives. Salts, such as potassium and sodium salts (e.g. potassium chloride), are known to produce such enrichment of electrical conductivity by increasing ionization. Similar effects can be realized with fluids which remain wholly in the gaseous state, rather than first being converted from the liquid form, in which case a relatively low temperature volume of gas such as helium, argon or air, enriched as needed, may be compressed, heated and caused to expand rapidly to develop high pressures and resultant high velocities of flow. In another arrangement, as illustrated, the vessel comprises a spherical reactor core 41 into which is pumped a liquid nuclear fuel 42 which can there reach the critical compact mass for supporting a nuclear chain reaction and generating intense heat and pressure which forces the conductive fluid from the vessel into the generator for the purpose of developing the electrical output. A fuel such as uranyl sulphate dissolved in heavy water is an example of a solution which will become critical in the reactor core alone, without becoming so in other parts of the closed system in which the fissionable atoms are too dispersed to form a critical mass.

Electrical power output is generated in the manner hereinbefore described as the conductive fluid is thrust through generator structure 4 at velocities higher than the critical value. Throughout this operation, equipment 38 insures that a wanted frequency of three-phase output at a satisfactory power factor is delivered to the load 39. The conductive fluid loses kinetic energy in its passage through the generator, work being performed and the resultant loss of energy being transformed into electrical power as the fluid interacts with the radial stator field. Thereafter, the fluid is exhausted from downstream outlet 3 to enter a condenser-preheater assembly 43 in which the convolutions of fluid-conducting conduit 44 are in heat-exchange relationship with a cooling coil 45 and with a pre-heat coil 46. Thermal energy of the fluid exhaust is released to a common coolant fluid, forced between inlet 47 and outlet 48 of coil 45 from an external source (not shown), whereby the exhaust fluid is cooled and condensed before entering a pump 49 which is conveniently energized by electrical output of the generator over leads 50. Operation of the pump is also preferably under control of the output of a control unit 51, as designated by the coupling 52, for self-regulation purposes described hereinafter. From the outlet conduit 53 of pump 49, the relatively cool fluid is delivered to the coolant inlets 13 and 37 of the generator stator structure, whereupon it is circulated through the longitudinal openings in the inner core and through the aforementioned spacings within the outer core assembly shrouded by housing parts 29 and 30. The fluid which has become heated in these circulation paths is released into conduit 54 by outlets 12 and 32 and flows through pre-heat coil 46 of the condenser-preheater 43 where it is further heated by a heat exchange with conduit 44 before the fluid in the latter has been cooled to a lesser temperature by cooling coil 45. Conduit 55 completes the fluid circulation loop by coupling fluid back to the boiler apparatus 40 for repetition of the described operations. A reservoir 56 introduces additional fluid, or affords storage of fluid withdrawn from the system by pump 49, as required. The latter is particularly important where nuclear fuel solutions are involved, inasmuch as the reactions are to be controlled by regulating (adding or withdrawing) the amount of solution 42 in the spherical reactor core. A sensor 56 within the vessel 41, sensing pressure or temperature, applies signals to control unit 51 along coupling 57 for this purpose, whereby the latter in turn delivers output signals to pump 49, by way of coupling 52, which control the direction and extent of pumping. Considering the sensor 56 as a pressure-responsive device, for example, it serves to deliver electrical signals to control unit 51, in the form of an electrical discriminator network and servo amplifier, which detects when the pressure is above or below the value needed to develop the required flow through the generator and actuates the pump 49 to decrease or increase, respectively, the flow of fluid into vessel 41. Under conditions of excessive pressures, the fuel mass is decreased by reversing pump 49 to back fuel solution into the reservoir 43. In a similar manner, the frequency, voltage, and current of the electrical output is also subject to automatic regulation as needed. For this purpose, the variations in any one or all of these characteristics are sensed in known manner within the output circuitry, as within the equipment 38 for example, and characterizing electrical signals are applied to the amplifier of control unit 51 by way of coupling 58. Assuming that power output to the load tends to drop below the demands of the load, as indicated by insufficient output current for example, the characterizing electrical signal applied to control unit 51 causes it to actuate the pump 49 to increase the flow of solution into vessel 41 and, thereby, to increase the velocity of fluid flow through the generator sufficiently to provide the needed additional electrical output. The reversed actions are initiated should the frequency or voltage of output increase beyond the desired values in other instances, of course. Where the boiler assembly 40 is of a conventional coal or oil-fired construction, the output of control unit 51 is instead conveniently applied in regulation of the heat source within the boiler assembly, using conventional techniques, such that the output of ionized gaseous fluid is, in turn, regulated to have greater or lesser velocities and densities. Auxiliary pumping may be introduced into various parts of the system, in accordance with known techniques, and conventional valving, storage vessels and the like are employed routinely according to the dictates of the system which is used. By way of illustration of this, the cooled and condensed fluid which has left the generator may be delivered to a storage vessel and circulated through the coolant passages of the generator in a closed loop at a rate especially suited to the needs of cooling, while the rates of feed of the fluid to the boiler are controlled differently. Known forms of valves and pumps provide the basis for such designs. The coolant flow through the generator stator assembly need not be of the same fluid which is relied upon to induce the output signals, of course, and it may therefore be convenient and preferable in some installations simply to force a common type of gaseous or liquid coolant through the stator assembly independently of the flow circuitry for the conductive fluid.

Constructions in accordance with these teachings lend themselves to fabrication in relatively small size for relatively high electrical power outputs. Moreover, the power can be generated directly at the desired commercial frequencies, although this is not a limiting factor and output frequencies in excess of and lower than 60 cycles per second can be obtained through routine design and adjustment as the intended uses warrant. Core and winding arrangements may be varied from the specific forms illustrated, of course, the use of powdered core materials rather than shaped laminations being one example of a fabrication aid, and the number, distribution, and interconnection of polyphase windings may also be varied (e.g., delta and Y connections, two-phase rather than three-phase winding arrangements).

The conductive fluid may comprise a liquid, vapor, gas, moisture of gases, and the like, satisfying the requirements that it be highly conductive, or that it be highly conductive upon enrichment with other agents such as the salts of potassium or sodium, and that it lend itself to being propelled through the generator at the needed high velocities. Geometry of the generator is not limited to that illustrated, the intended effects also being available from constructions of other configurations in which the fluid is forced past a polyphase distributed magnetic field, the flux lines of which extend transversely to the direction of fluid flow, and in which the polyphase field has a resultant pattern shifting in the direction of fluid flow at a substantially lesser velocity than that of the fluid, and in which the polyphase winding is parallelled with tuning reactances or a synchronous machine, and in which electrically conductive paths are provided for the currents induced in the fluid to travel in closed loops transverse to the direction of fluid flow.

Accordingly, it is to be understood that the specific embodiments of the invention herein disclosed are of a descriptive rather than a limiting nature, and that various changes, combinations, substitutions or modifications may be employed in accordance with these teachings without departing either in spirit or scope from this invention in its broader aspects.

What I claim as new and desire to secure by Letters Patent of the United States is:

1. Apparatus for generating electricity, comprising a stator assembly having concentric inner and outer core members of magnetic material spaced to form a substantially annular and linearly extending fluid flow passageway therebetween and including distributed polyphase-connected electrical winding means for developing a polyphase magnetic field having flux lines extending substantially radially across said passageway and having a substantially sinusoidal field intensity distribution travelling substantially linearly in one axial directon along said passageway at a predetermined velocity, means forcing high-temperature ionized conductive gaseous fluid through said passageway in said one direction at a velocity higher than said predetermined velocity, refractory insulating material lining said passageway and fully separating the high-temperature ionized fluid in said passageway from said stator assembly, said annular passageway providing substantially circular paths transverse to the axis of said passageway for electrical currents induced in said ionized gaseous fluid to circulate angularly about said axis in substantially normal relation to the radial flux lines, said electrical winding means being disposed to have polyphase electrical currents induced therein by the magnetic fields produced by said currents induced in said ionized gaseous fluid, means having electrical reactance characteristics connected in circuit with said winding means and controlling power output characteristics of said winding means, said stator assembly further having coolant passages therethrough independently of said annular passageway for conducting coolant fluid therethrough and preserving the temperatures of said core members, windings and refractory material at less than the high temperatures of said ionized gaseous fluid, and means delivering fluid at less than said high temperatures to said coolant passages, whereby polyphase alternating current electrical signals produced by said winding means provides self-excitation for developing said field and overcome the power losses in said stator assembly and the reactance means and provide net electrical output for supply to a load.

2. Apparatus for generating electricity as set forth in claim 1 wherein said refractory material comprises an uninterrupted ceramic lining about the inner peripheral surfaces of said outer core member about said passageway, and an uninterrupted ceramic lining about the outer peripheral surfaces of said inner core member about said passageway.

3. Apparatus for generating electricity as set forth in claim 1 wherein said means forcing high-temperature ionized conductive gaseous fluid through said passageway comprises a high-temperature boiler assembly heating fluid to a temperature at which it is in a highly conductive ionized gaseous form and directing said gaseous fluid into said passageway at high pressures developing said higher velocity, and wherein said means delivering fluid to said coolant passages comprises a heat-exchange assembly coupled with said passageway and cooling the fluid emitted from the downstream end of said passageway and coupling the cooled fluid into said coolant passages, and further comprising means delivering the fluid emitted from said coolant passages back into said boiler assembly.

4. Apparatus for generating electricity as set forth in claim 3 comprising means connecting said boiler assembly, flow passageway, said means delivering fluid to said coolant passages, said coolant passages, and said means delivering fluid from said coolant passages into said boiler assembly, together in a closed fluid recirculation loop.

5. Apparatus for generating electricity as set forth in claim 4 further comprising a fluid reservoir sealed with said connecting means for storage of fluid circulated in said closed loop, and further comprising pumping means for forcing the fluid into said boiler assembly.

References Cited in the file of this patent

UNITED STATES PATENTS 1,916,076    Rupp _____ June 27, 1933

FOREIGN PATENTS 738,511    Great Britain _____ Feb. 28, 1953